United States Patent [19]

Fischbeck et al.

[11] 4,326,205

[45] Apr. 20, 1982

[54] COINCIDENCE FLUID DISPLACEMENT AND VELOCITY EXPRESSION OF DROPLET

[75] Inventors: Kenneth H. Fischbeck, Dallas; Marcus M. Schnarr, Lewisville, both of Tex.

[73] Assignee: Xerox Corporation, Stamford, Conn.

[21] Appl. No.: 47,618

[22] Filed: Jun. 11, 1979

Related U.S. Application Data

[63] Continuation of Ser. No. 731,406, Oct. 12, 1976, abandoned.

[51] Int. Cl.[3] .......... G01D 15/18
[52] U.S. Cl. .......... 346/140 R
[58] Field of Search .......... 346/140 PD, 75

[56] References Cited

U.S. PATENT DOCUMENTS

| | | | |
|---|---|---|---|
| 3,747,120 | 7/1973 | Stemme | 346/140 X |
| 3,848,118 | 11/1974 | Rittberg | 346/140 X |
| 3,974,508 | 8/1976 | Blumenthal | 346/140 |
| 4,045,801 | 8/1977 | Iwasaki | 346/140 |
| 4,068,144 | 1/1978 | Toye | 346/75 X |
| 4,104,645 | 8/1978 | Fischbeck | 346/140 |

OTHER PUBLICATIONS

Fowler, R. L.; Dual-Nozzle Ink Jet Printer; IBM Tech. Disc. Bulletin, vol. 18, No. 2, Jul. 1975, pp. 448-449.

*Primary Examiner*—Joseph W. Hartary
*Attorney, Agent, or Firm*—Sheldon F. Raizes

[57] ABSTRACT

A coincidence ink jet principle is disclosed wherein each ink jet has two inlet passages communicated to an outlet orifice. Each inlet passage is communicated to a respective transducer chamber. The fluid displacement and fluid velocity effected by a pressure pulse generated by each transducer chamber in a respective inlet passage is insufficient to express a droplet from the orifice. However, the combined fluid displacement and fluid velocity, which is the result of the pressure pulses generated by the transducers being coincident at the orifice, will result in a droplet being expressed from the orifice.

In one system disclosed utilizing the above described principle, each inlet passage of a jet is communicated to a respective transducer and each transducer is connected to a respective electronic driver. In this system, the number of electronic drivers and transducer chambers are substantially less than the number of ink jets. These transducer chambers are time shared for expressing an ink droplet. Actuation of the two transducer chambers communicated to a particular jet, in such a manner that the pressure pulses generated by the respective transducers coincide at the orifice, will effect expression of a droplet therefrom.

In another system disclosed utilizing the above described principle, a master transducer chamber is communicated to a separate respective droplet expression transducer chamber and each droplet expression transducer chamber is connected to a respective electronic driver. In this system, the master transducer chamber is actuated to create at each orifice a pressure pulse which is below the threshold pressure pulse for expressing an ink droplet therefrom. Actuation of any of the droplet expression transducer chambers to generate a pressure pulse which coincides at a particular orifice with the pressure pulse generated by the master transducer, will bring the resultant pressure pulse at the orifice above threshold to effect expression of the droplet from a particular orifice.

11 Claims, 8 Drawing Figures

COINCIDENCE FLUID DISPLACEMENT AND VELOCITY EXPRESSION OF DROPLET

This is a continuation of application Ser. No. 731,406, filed Oct. 12, 1976 now abandoned.

DESCRIPTION OF THE INVENTION

This application relates to U.S. Pat. No. 4,104,645 filed Oct. 12, 1976 which is a continuation-in-part of U.S. application Ser. No. 625,988, filed Oct. 28, 1975 now abandoned.

This invention relates to a multiple ink jet printing system which expresses droplets of liquid ink through certain ink jet orifices upon a demand which is in accordance with an image to be printed.

It is an object of this invention to provide a coincidence ink jet system wherein combined fluid displacement and fluid velocity, as a result of pressure pulses from two transducer chambers being coincident at a particular orifice, effects droplet expression from the orifice.

Other objects of the invention will become apparent from the following description with reference to the drawings wherein.

Figure 1:
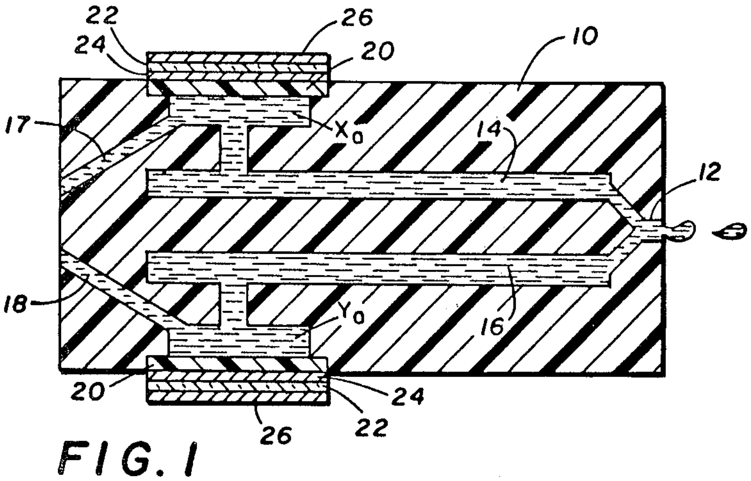
FIG. 1 is a cross section view of an ink jet assembly illustrating the principles of the invention disclosed herein.

Referring to FIG. 1, an ink jet housing 10 has a droplet outlet orifice 12 and fluid pressure passages 14 and 16 communicated with cylindrical transducer chambers $X_a$ and $Y_a$ respectively. The passages 14 and 16 intersect each other at the orifice 12 which is the only communication between the passages. Fluid replenishing passages 17 and 18 communicate fluid from a reservoir (not shown) to a respective one of the transducer chambers $X_a$ and $Y_a$. Each chamber $X_a$, $Y_a$ is sealed by a flat flexible layer 20 bonded to the housing 10. The transducer chambers and passages 14 and 16 are completely filled with liquid ink. A piezoelectric ceramic member 22 is sandwiched between and bonded to a pair of electrodes 24 and 26 with the electrode 24 being bonded to the layer 20, thereby effectively bonding the piezoelectric member 22 thereto. The piezoelectric member 22 is polarized during the manufacture thereof to contract in a plane parallel to the plane of the flexible layer 20 when excited by applying a voltage potential across the conductive members 24 and 26. Contraction of the piezoelectric member 22 will cause the flexible layer 20 to buckle inwardly thereby decreasing the volume in its respective chamber and effecting pressure on the liquid ink therein. The housing 10 and flexible layer 20 may be glass or plastic.

When the piezoelectric member for either transducer $X_a$ or $Y_a$ is activated, a fluid pressure pulse will occur in a respective one of passages 14 and 16 causing displacement of ink along the respective passage. The voltage potential applied across the piezoelectric member for each transducer chamber $X_a$ and $Y_a$ is of such magnitude and duration that the fluid displacement and fluid velocity effected by a pressure pulse generated by each transducer chamber in a respective fluid pressure passage 14 or 16 is insufficient to express a droplet from the orifice 12. But the combined fluid displacement and fluid velocity, which is the result of the pressure pulse generated by transducer chamber $X_a$ and the pressure pulse generated by transducer chamber $Y_a$ being coincident at the orifice 12, will result in a droplet being expressed from the orifice 12. Thus, only when the piezoelectric members for both transducer chambers $X_a$, $Y_a$ are activated in a manner that pressure pulses generated by the respective transducers coincide at the orifice 12 will an ink droplet be expressed from orifice 12. It should be understood that the peaks of the pressure pulses generated by both transducers do not necessarily coincide at the orifice 24, but there must be at least an overlap of the pressure pulses thereat. In this illustration, where the orifice is hydraulically equal distance from each transducer chamber, the piezoelectric members for both transducers will be simultaneously or coincidentally activated. The claimed subject matter of this application is directed to the above-described principle of coincidently combining fluid displacement and velocity from two transducer chambers to express an ink droplet from an orifice.

Figure 2:
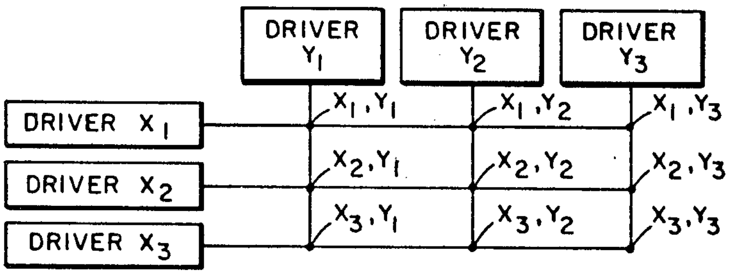
FIG. 2 is a view of an electronic matrix system.

The aforedescribed principle has specific utilization in a jet array system where a large number of jets are utilized or in a dense linear jet array. This will become apparent from the following discussion. It is well known in the electrical engineering art that if two independent stimulators are required to effect stimulation of a device and if time sequencing is permitted, then the number of stimulators required is only twice the square root of the number of stimulated devices. For example, only 120 stimulators are needed for 3600 stimulated devices and only 128 stimulators are required for 4096 stimulated devices. This principle is grasped if the stimulated devices are visualized in a matrix array as illustrated in FIG. 2. A plurality of electrical stimulators or input drivers $X_1$, $X_2$ and $X_3$ are arranged along an "X" coordinate while a plurality of electrical stimulators or drivers $Y_1$, $Y_2$ and $Y_3$ are arranged along the other or "Y" coordinate. The six stimulators or drivers are electrically connected at nine intersections with the intersections representing stimulated devices $X_1$, $Y_1$; $X_1$, $Y_2$; $X_1$, $Y_3$; $X_2$, $Y_1$; $X_2$, $Y_2$; $X_2$, $Y_3$; $X_3$, $Y_1$' $X_3$, $Y_2$ and $X_3$, $Y_3$. Activation of any one stimulator by itself will not activate any of the stimulated devices. However, activation of any two stimulators on different coordinates will activate a stimulated device. For instance, stimulated device $X_1$, $Y_2$ will be activated when stimulators or drivers $X_1$ and $Y_2$ are actuated.

Figure 3:
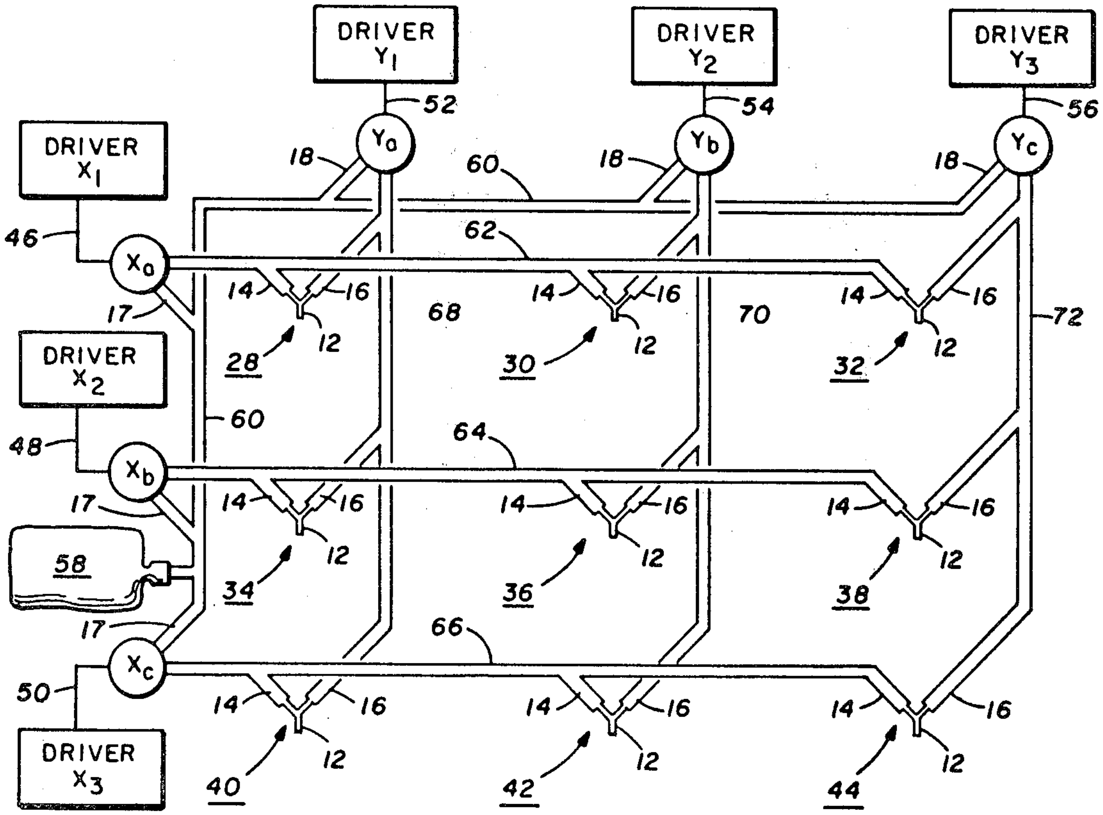
FIG. 3 is a schematic fluid circuit illustrating the principles of the invention.

Referring now to FIG. 3, a schematic fluid circuit is illustrated applying the above described concepts to an array of nine ink jets 28, 30, 32, 34, 36, 38, 40, 42, and 44, each of which has two pressure passages 14 and 16 and an outlet orifice 12. Six electrical input drivers $X_1$, $X_2$, $X_3$, $Y_1$, $Y_2$ and $Y_3$ are electrically connected to a piezoelectric member 20 of transducer chambers $X_a$, $X_b$, $X_c$, $Y_a$, $Y_b$, $Y_c$, respectively, by a respective one of electrical lines 46, 48, 50, 52, 54 and 56. The fluid replenishing passages 17 and 18 are communicated to a flexible bag fluid supply reservoir 58 by conduit 60.

Figure 4:
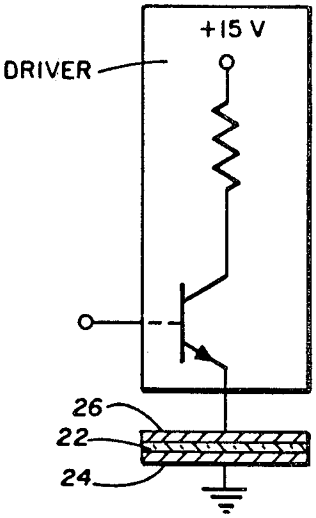
FIG. 4 is a schematic of a typical electronic driver electrically connected to a piezoelectric member.

Referring to FIG. 4, there is illustrated a piezoelectric member 22 electrically connected to a typical electronic driver which is an NPN type transistor in an emitter follower configuration driven between a non-conductive state and a state of saturated conduction in response to positive going pulse-like input signals supplied to the base of the transistor. All of the electronic drivers are electrically connected to their respective piezoelectric members in the same manner.

Referring back to FIG. 3, a conduit 62 communicates transducer chamber $X_a$ with pressure inlets 14 of jets 28, 30 and 32; conduit 64 communicates transducer chamber $X_b$ with pressure inlets 14 of jets 34, 36 and 38; conduit 66 communicates transducer chamber $X_c$ with pressure inlets 14 of jets 40, 42 and 44; conduit 68 communicates transducer chamber $Y_a$ with pressure inlets 16 of jets 28, 34 and 40; conduit 70 communicates transducer chamber $Y_b$ with pressure inlets 16 of jets 30, 36 and 42; and conduit 72 communicates transducer chamber $Y_c$ with pressure inlets 16 of jets 32, 38 and 44. The transducer chambers, conduits and pressure inlets as well as pulse duration and magnitude are all designed that the hydraulic properties at each ink jet are the same. Since an orifice may be hydraulically unequal distances away from the two transducers to which it is communicated, the transducers, in actual practice, will be activated out of phase with each other so the pressure pulse generated by each transducer will occur coincidentally at the orifice 12. The following table shows which jets express droplets therefrom when particular drivers are energized:

| Electronic Drivers Cooperatively Energized | Droplet Expressed From Jet |
|---|---|
| $X_1$, $Y_1$ | 28 |
| $X_1$, $Y_2$ | 30 |
| $X_1$, $Y_3$ | 32 |
| $X_2$, $Y_1$ | 34 |
| $X_2$, $Y_2$ | 36 |
| $X_2$, $Y_3$ | 38 |
| $X_3$, $Y_1$ | 40 |
| $X_3$, $Y_2$ | 42 |
| $X_3$, $Y_3$ | 44 |

Figure 5:
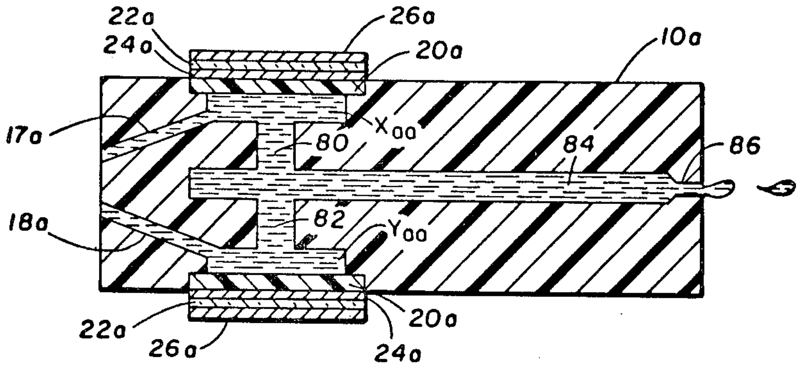
FIG. 5 shows a modification of the ink jet assembly disclosed in FIG. 1 employing the principles of the invention.

FIG. 5 discloses a modification of the embodiment of FIG. 1. Those elements which are the same as in the embodiment of FIG. 1 are designated by the same reference numerals, only with an "a" affixed thereto. In this embodiment, a pair of fluid pressure passages 80 and 82 lead from a respective transducer chamber $X_{aa}$ and $Y_{aa}$ to an outlet passage 84 which, in turn, terminates at a droplet outlet orifice 86. The voltage potential applied across the piezoelectric member for each transducer chamber $X_{aa}$ and $Y_{aa}$ is of such magnitude and duration that the fluid displacement and fluid velocity effected by a pressure pulse generated in a respective fluid pressure passage 80 and 82 is insufficient by itself to express a droplet from the orifice 86. But the combined fluid displacement and fluid velocity, which is the result of the pressure pulse generated by transducer chamber $X_{aa}$ and the pressure pulse generated by transducer chamber $Y_{aa}$ being coincident at the orifice 86, will result in a droplet being expressed from the orifice 86.

Figure 6:
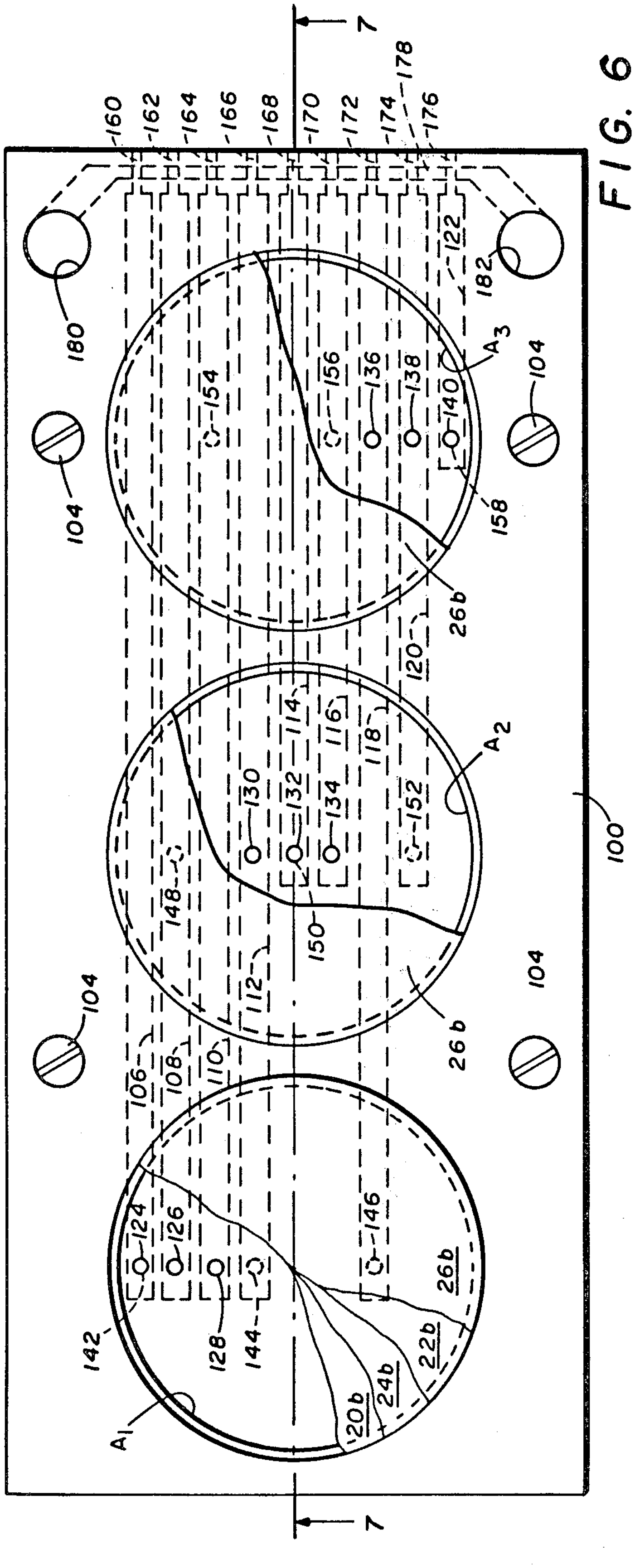
FIG. 6 is a top view of a linear array ink jet assembly.
Figure 7:
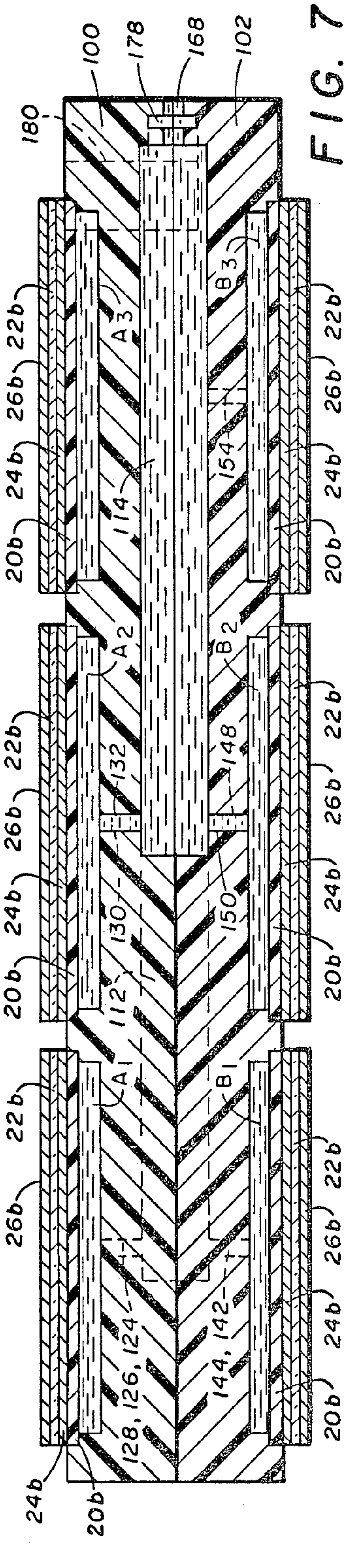
FIG. 7 is a view taken along section line 7—7 of FIG. 6.

Referring to FIGS. 6 and 7, a nine jet ink jet assembly is shown which incorporates the principles described. All elements which are the same as in the embodiment of FIG. 1 will be designated by the same reference numerals only with a "b" affixed thereto.

A glass or plastic housing comprises two members 100, 102 secured together by screws 104. The members 100, 102 each have nine mating channels forming fluid pressure passages 106, 108, 110, 112, 114, 116, 118, 120, and 122. Located in member 100 are fluid transducer chambers $A_1$, $A_2$ and $A_3$, and located in member 102 are fluid transducer chambers $B_1$, $B_2$, and $B_3$. The chamber $A_1$ is communicated to pressure passages 106, 108 and 110 by inlet passages 124, 126 and 128, respectively. Chamber $A_2$ is communicated to pressure passages 112, 114 and 116 by inlet passages 130, 132 and 134, respectively. Chamber $A_3$ is communicated to pressure passages 118, 120 and 122 by inlet passages 136, 138 and 140, respectively. Chamber $B_1$ is communicated to pressure passages 106, 112 and 118 by inlet passages 142, 144 and 146, respectively. Chamber $B_2$ is communicated to pressure passages 108, 114 and 120 by inlet passages 148, 150 and 152, respectively. Chamber $B_3$ is communicated to pressure passages 110, 116 and 122 by inlet passages 154, 156 and 158, respectively. At the front end of the pressure passages 106, 108, 110, 112, 114, 116, 118, 120 and 122 are orifices 160, 162, 164, 166, 168, 170, 172, 174 and 176, respectively. A fluid replenishing channel 178 passes between each pressure passage and its respective orifice. A reservoir (not shown) is communicated to ports 180 and 182 on each side of and in communication with the channel 178.

The voltage potential applied across the piezoelectric member $22_b$ for each transducer chamber is of such magnitude and duration that the fluid displacement and fluid velocity effected by a pressure pulse generated by each transducer chamber in a respective fluid pressure passage is insufficient to express a droplet from any of the orifices. However, the combined fluid displacement and fluid velocity, which is the result of the pressure pulses generated by each of two transducers being coincident at a particular orifice, will result in a droplet being expressed from a particular orifice. The following table shows which jets express droplets therefrom when particular transducers are activated:

| Transducers Cooperatively Activated | Droplet Expressed From Jet |
|---|---|
| $A_1$, $B_1$ | 160 |
| $A_1$, $B_2$ | 162 |
| $A_1$, $B_3$ | 164 |
| $A_2$, $B_1$ | 166 |
| $A_2$, $B_2$ | 168 |
| $A_2$, $B_3$ | 170 |
| $A_3$, $B_1$ | 172 |
| $A_3$, $B_2$ | 174 |
| $A_3$, $B_3$ | 176 |

The transducers in the matrix address system described above must be addressed on a time-shared basis, which is a limiting factor on transducer activation frequency and thus the printing speed of the ink jet array assembly. It has been found that the above coincidence ink jet principle may also be applied in a jet array which utilizes one addressable transducer for each jet. The utilization of this coincidence jet principle in such an array allows a smaller area of transducers to be utilized per jet when compared to the size of a transducer in such an array without the coincidence jet principle. With the transducers occupying a smaller space per jet, more transducers may be packed in a given space, which then permits the construction of a dense array with one addressable transducer for each jet. The jet array to be described does not require time sharing of transducers resulting in increased activation frequency over the matrix address system. This array is illustrated in the fluid schematic of FIG. 8. A master transducer chamber 200 is communicated by inlet passages 202, 204, 206, 208, 210, 212, 214, 216 and 218 to pressure passages 220, 222, 224, 226, 228, 230, 232, 234 and 236, respectively. Droplet expressing transducer chambers 238, 240, 242, 244, 246, 248, 250, 252 and 254 are communicated by inlet passages 256, 258, 260, 262, 264, 266, 268, 270 and 272, respectively, to the fluid pressure passages 220, 222, 224, 226, 228, 230, 232, 234 and 236. Orifices 274, 276, 278, 280, 282, 284, 286, 288 and 290 are at the end of the pressure passages 220, 222, 224, 226, 228, 230, 232, 234 and 236, respectively. Individual electronic drivers are connected to the master transducer chamber and each droplet expressing transducer chamber for applying a voltage potential across the respective piezoelectric members. A liquid replenishing supply conduit 292 communicates a reservoir 294 to the master transducer chamber 200.

The voltage potential applied across the piezoelectric member for the master transducer is of such magnitude and duration that the fluid displacement and fluid velocity effected by a pressure pulse produced in the nine fluid pressure passages communicated therewith is just below the threshold which is necessary to express a droplet through any of the orifices. The voltage potential applied across the piezoelectric member for each of the droplet-expressing transducers is of such magnitude and duration that the fluid displacement and fluid velocity effected by a pressure pulse produced in its respective pressure passage is substantially below that produced by the master transducer but of a level that the combined fluid displacement and fluid velocity, which is the result of the pressure pulse generated by the master transducer and the pressure pulse generated by any one of the droplet-expressing transducers when coincident at the orifice, will be above the threshold at a respective orifice to express a droplet therefrom.

Figure 8:
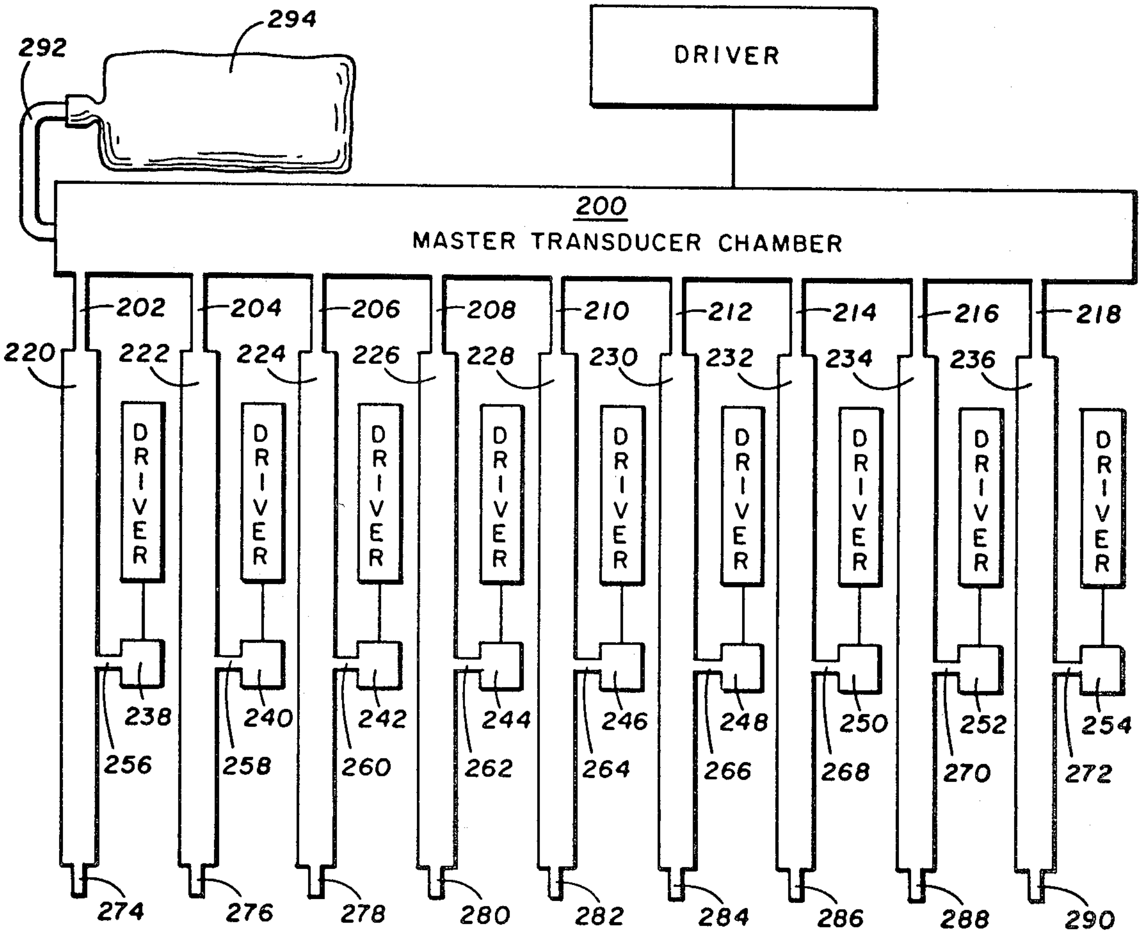
FIG. 8 is a schematic of a fluid circuit illustrating the principle of this invention in a different system.

Also, the coincidence jet illustrated in FIG. 1 may also be employed in a multiple array of the system of FIG. 8. A master transducer chamber would be communicated to one inlet passage, such as passage 14, of each jet in a group of jets and a droplet expressing transducer would be communicated to the other inlet passage, such as passage 16, of a respective jet in the same group of jets.

The jet assembly of FIG. 5 and the schematic of FIG. 8 could be designed to include a fluid rectifier passage similar to replenishing channel 178 of FIGS. 6 and 7, rather than replenishing fluid at the transducer chamber. Similarly, the jet assembly of FIGS. 6 and 7 could be designed to replenish fluid at the transducer chambers, rather than adjacent to the orifices.

It should be understood that displacement devices other than piezoelectric crystals can be utilized in employing the above invention. For instance, such displacement devices may be electromagnetic or manetostrictive.

What is claimed is:

1. In a multiple ink jet assembly comprising: at least two ink jets, each having a pressure channel with an outlet orifice at one end thereof; a first fluid chamber; first passage means communicating said first fluid chamber with the channel of one of said jets at a remote distance from the orifice thereof; a second fluid chamber; second passage means communicating said second fluid chamber with the channels of each of said jets at a remote distance from the orifice thereof; each said channel defining a predetermined fixed fluid path between the communication of said passage means therewith and its respective orifice; liquid in said first and second fluid chambers and each of said passage means and channels; means for independently decreasing the volume of each of said first and second fluid chambers and generating pressure pulses therefrom of an amplitude and duration that a pressure pulse generated by one chamber will result in inadequate fluid displacement and inadequate fluid velocity to express a droplet from any of said orifices, but the combined fluid displacement and fluid velocity, which is the result of the pressure pulse generated by said first chamber and the pressure pulse generated by said second chamber being coincident at the orifice of said one jet, will effect expression of a liquid droplet therefrom; and means for effecting coincidently at the orifice of said one jet the pressure pulse generated by said first chamber and the pressure pulse generated by said second chamber.

2. The structure as recited in claim 1 wherein said first and second passage means are communicated to said channel of said one jet at locations which are hydraulically equal distance from the respective outlet orifice.

3. The structure as recited in claim 1 wherein said first and second passage means are communicated to said channel of said one jet at locations which are hydraulically unequal distance from the respective outlet orifice.

4. The structure as recited in claim 1 further comprising a fluid supply passage means communicating with the orifice and the channel of said one jet and located contiguous the respective orifice and between the respective orifice and the locations at which said first and second passage means communicate with the respective channel.

5. The structure as recited in claim 1 further comprising a third fluid chamber; third passage means communicating said third fluid chamber to the channel of the other of said ink jets; liquid in said third chamber and third passage means; means for decreasing the volume of said third chamber independently of said first and second fluid chambers and generating pressure pulses therefrom of an amplitude and duration that a pressure pulse generated thereby will result in inadequate fluid displacement and inadequate fluid velocity to express a droplet from the orifice of said other jet, but the combined fluid displacement and fluid velocity, which is the result of the pressure pulse generated by said third chamber and the pressure pulse generated by said second chamber being coincident at the orifice of said other jet, will effect expression of a liquid droplet therefrom; and means for effecting coincidently at the orifice of said other ink jet the pressure pulse generated by said third chamber and the pressure pulse generated by said second chamber.

6. The structure as recited in claim 1 further comprising fluid supply means communicated directly to at least one of said fluid chambers.

7. In a multiple ink jet assembly comprising: at least two groups of ink jets, each ink jet having a pressure channel with an outlet orifice at one end thereof; a first fluid chamber; first passage means communicating said first fluid chamber with each of the channels of the jets in one group of jets at a remote distance from the respective orifice thereof; a second fluid chamber; second passage means communicating said second fluid chamber with each of the channels of the jets in the other group of jets and with only one of the channels of said first group of jets at a remote distance from the respective orifice thereof; each said channel defining a predetermined fixed fluid path between the communication of said passage means therewith and its respective orifice; liquid in said first and second fluid chambers and each of said passage means and channels; means for independently decreasing the volume of each of said first and second chambers and generating pressure pulses therefrom of an amplitude and duration that a pressure pulse generated by one chamber will result in inadequate fluid displacement and inadequate fluid velocity to express a droplet from any of said orifices, but the combined fluid displacement and fluid velocity, which is the result of the pressure pulse generated by said first chamber and the pressure pulse generated by said second chamber being coincident at the orifice of said one channel, will effect expression of a fluid droplet therefrom; and means for effecting coincidently at the orifice of said one channel the pressure pulse generated by said first chamber and the pressure pulse generated by said second chamber.

8. The structure as recited in claim 7 further comprising a fluid supply passage means communicating with the orifice and the channel of said one jet and located contiguous the respective orifice and between the respective orifice and the locations at which said first and second passage means communicate with the respective channel.

9. The structure as recited in claim 7 wherein said channel of said one jet is communicated to said first and second passage means at locations which are hydraulically unequal distance from the respective orifice.

10. The structure as recited in claim 7 wherein said channel of said one jet is communicated to said first and second passage means at locations which are hydraulically equal distance from the respective outlet orifice.

11. The structure as recited in claim 7 further comprising fluid supply means communicated directly to at least one of said fluid chambers.

* * * * *